(12) United States Patent
Sivabalan et al.

(10) Patent No.: US 7,801,048 B1
(45) Date of Patent: *Sep. 21, 2010

(54) CONCURRENT PATH COMPUTATION USING VIRTUAL SHORTEST PATH TREE

(75) Inventors: Muthurajah Sivabalan, Kanata (CA); Jean Philippe Vasseur, Dunstable, MA (US); David Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1072 days.

This patent is subject to a terminal disclaimer.

(21) Appl. No.: 10/874,660

(22) Filed: Jun. 23, 2004

(51) Int. Cl.
*H04L 12/28* (2006.01)
*G08C 15/00* (2006.01)

(52) U.S. Cl. ..................... 370/238; 370/256; 370/401

(58) Field of Classification Search ................ 370/238, 370/254, 241, 239, 255, 401, 256
See application file for complete search history.

(56) References Cited

U.S. PATENT DOCUMENTS

| | | | |
|---|---|---|---|
| 6,147,971 A * | 11/2000 | Rochberger et al. ......... | 370/238 |
| 6,256,309 B1 * | 7/2001 | Daley et al. ............ | 370/395.43 |
| 6,665,273 B1 * | 12/2003 | Goguen et al. ............. | 370/252 |
| 6,985,959 B1 * | 1/2006 | Lee ............................ | 709/238 |
| 7,599,349 B2 * | 10/2009 | Vasseur et al. ............. | 370/351 |
| 2002/0147842 A1 * | 10/2002 | Breitbart et al. ............ | 709/241 |
| 2002/0172157 A1 * | 11/2002 | Rhodes ........................ | 370/238 |
| 2003/0072485 A1 * | 4/2003 | Guerin et al. ............... | 382/166 |
| 2004/0042406 A1 * | 3/2004 | Wu et al. ..................... | 370/238 |
| 2004/0148391 A1 * | 7/2004 | Lake et al. .................. | 709/224 |
| 2004/0184441 A1 * | 9/2004 | Wu et al. ..................... | 370/351 |
| 2005/0008014 A1 * | 1/2005 | Mitra et al. ................. | 370/392 |

OTHER PUBLICATIONS

A. Elwalid, "Routing and Protection in GMPLS Networks: From Shortest Paths to Optimized Designs," Nov. 2003, Journal of Lightwave Technology, vol. 21, No. 11, p. 2-4.*
U.S. Appl. No. 10/767,574, filed Jan. 29, 2004, Jean Phillippe Vasseur et al.
U.S. Appl. No. 10/848,744, filed May 19, 2004, Jean Phillippe Vasseur et al.
Awduche et al., "Requirements for Traffic Engineering Over MPLS", RFC 2702, Internet Engineering Task Force, Sep. 1999.
Berger et al., Generalized MPLS Signalinig—RSVP-TE Extensions, RFC 3473, Internet Engineering Task Force, Jan. 2003.

(Continued)

*Primary Examiner*—Dang T Ton
*Assistant Examiner*—Ryan C Kavleski
(74) *Attorney, Agent, or Firm*—Cindy Kaplan

(57) ABSTRACT

Parallelism is exploited to accelerate the distributed computation of an MPLS Traffic Engineering LSP across multiple Autonomous Systems or areas using a virtual shortest path tree. After relaying a path computation request, a path computation element immediately begins local path segment computations even before a response to the request is received. When a response including virtual shortest path tree information is received, the tree is extended using the previously computed path segments. Also, a path computation element can verify the local feasibility of the requested path after receiving a request so that a requesting head-end or upstream path computation element can be quickly informed that a constraints-satisfying path is not available.

41 Claims, 4 Drawing Sheets

OTHER PUBLICATIONS

Braden et al., Resouce ReSerVation Protocol (RSVP)—Version 1 Functional Specification, RFC 2205, Internet Engineering Task Force, Sep. 1997.

Lindem et al., "Extensions to OSPF for Advertising Optional Router Capabilities", Internet Draft, Internet Engineering Task Force, Oct. 2003.

Rosen et al., "Multiprotocol Label Switching Architecture", RFC 3031, Internet Engineering Task Force, Jan. 2001.

Vasseur et al., "OSPF Traffic Engineering Capability TLVs", Internet Draft, Internet Engineering Task Force, Oct. 2002.

Vasseur et al., "RSVP Path Computation Request and Reply Messages", Internet Draft, Internet Engineering Task Force, Jun. 2002.

Vasseur et al., "Inter-AS MPLS Traffic Engineering", Internet Draft, Internet Engineering Task Force, Feb. 2003.

Vasseur et al., "IS-IS MPLS Traffic Engineering Capabilities", Internet Draft, Internet Engineering Task Force, Feb. 2004.

Vasseur et al., "OSPF Traffic Engineering Capabilities", Internet Draft, Internet Engineering Task Force, Feb. 2004.

* cited by examiner

CONCURRENT PATH COMPUTATION USING VIRTUAL SHORTEST PATH TREE

STATEMENT OF RELATED APPLICATIONS

The present application is related to the subject matter of the following U.S. Patent Applications:

U.S. patent application Ser. No. 10/767,574 entitled "COMPUTING INTER-AUTONOMOUS SYSTEM MPLS TRAFFIC ENGINEERING LSP PATHS," filed on Jan. 29, 2004.

U.S. patent application Ser. No. 10/848,744, entitled "REOPTIMIZATION TRIGGERING BY PATH COMPUTATION ELEMENTS," filed on May 19, 2004.

The contents of the above-identified patent applications are herein incorporated by reference in their entirety for all purposes.

BACKGROUND OF THE INVENTION

The present invention relates to data networking, and more particularly to path computation in certain types of situations.

MPLS (Multi-Protocol Label Switching) Traffic Engineering has been developed to meet data networking requirements such as guaranteed available bandwidth. MPLS Traffic Engineering exploits modem label switching techniques to build guaranteed bandwidth end-to-end tunnels through an IP/MPLS network of label switched routers (LSRs). These tunnels are a type of label switched path (LSP) and thus are generally referred to as MPLS Traffic Engineering LSPs.

Establishment of an MPLS Traffic Engineering LSP from a head-end to a tail-end involves computation of a path for a network of LSRs. Optimally, the computed path is the "shortest" path, as measured in some metric, that satisfies all of the relevant constraints such as e.g., required bandwidth, affinities, etc. Computation of the path generally requires knowledge of network topology and available resources on nodes between the head-end and tail-end.

It is desirable to establish MPLS Traffic Engineering LSPs across the borders of Autonomous Systems and areas. The term "Autonomous System" generally refers to a group of routers within a network that are subject to a common authority and use the same intradomain routing protocol. An "area" is a collection of routers that share full network topology information with each other but not routers in other areas. To improve routing scalability, the service provider may divide Autonomous System into multiple areas.

U.S. patent application Ser. No. 10/767,574 explains techniques to compute paths of MPLS Traffic Engineering LSPs across the boundaries of areas and/or Autonomous Systems. To overcome the difficulty posed by the lack of a global view of network topology and resources, the path computation operations are distributed among multiple path computation elements (PCEs) positioned in each of the multiple Autonomous Systems or areas.

The path computation elements cooperate to establish and develop a virtual shortest path tree (VSPT) in an iterative and recursive fashion. In one virtual shortest path tree computation procedure, a requesting head-end sends its request for placement of an MPLS Traffic Engineering LSP to a local path computation element in the same Autonomous System or area. This path computation element forwards the path computation request to the path computation element in the next Autonomous System or area on the way to the requested tail-end. The path computation request is propagated from path computation element to path computation element until it reaches the path computation element in the same Autonomous System or area that contains the tail-end.

This final path computation element computes a virtual shortest path tree routed at the tail-end node and extending to the border routers that couple the local Autonomous System or area to the previous one in line back to the head-end. Once this virtual shortest path tree has been computed, information specifying it is transferred back to the previous path computation element. That path computation element extends the virtual shortest path tree to the border routers facing the next previous Autonomous System or area and transmits a specification of the extended tree to the next previous path computation element. When the virtual shortest path tree reaches the path computation element that received the original request from the head-end, that path computation element uses the received virtual shortest path tree and local network topology and resource information to compute the end-to-end path between the head-end and tail-end. The computed path information is then forwarded to the requesting head-end.

It can be seen then that this is essentially a serial computation technique even though the computations are distributed among multiple path computation elements. Each path computation element waits to receive virtual shortest path tree information from any downstream (towards tail-end) path computation elements before beginning its own computations. The computations undertaken by each path computation element may be very time consuming especially when there are multiple optimization criteria and constraints involved. Thus the accumulated computation time along the chain of path computation elements may be very large. A path computation element may in fact time out its request after not receiving requested virtual shortest path tree information for an extended period and try again, further adding to the load on processing resources.

What is needed are systems and methods for accelerating path computations employing the virtual shortest path tree technique.

SUMMARY OF THE INVENTION

Embodiments of the present invention exploit parallelism to accelerate the distributed computation of an MPLS Traffic Engineering LSP across multiple Autonomous Systems or areas using a virtual shortest path tree. After relaying a path computation request, a path computation element immediately begins local path segment computations even before a response to the request is received. When a response including virtual shortest path tree information is received, the tree is extended using the previously computed path segments. Also, a path computation element can verify the local feasibility of the requested path after receiving a request so that a requesting head-end or upstream path computation element can be quickly informed that a constraints-satisfying path is not available.

Further understanding of the nature and advantages of the inventions herein may be realized by reference to the remaining portions of the specification and the attached drawings.

DESCRIPTION OF SPECIFIC EMBODIMENTS

Figure 1:
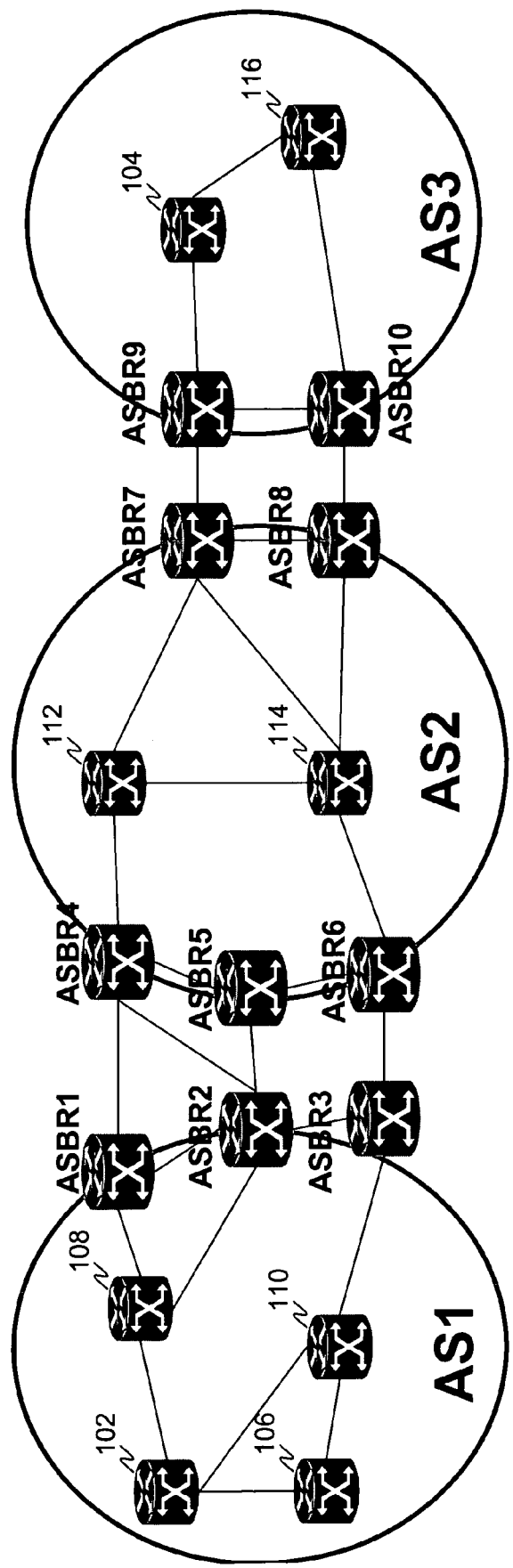
FIG. 1 depicts an inter-Autonomous System path computation scenario according to one embodiment of the present invention.

The present invention will be described with reference to a representative network environment and applies a certain combination of network protocols to forward data through the network. The links may be implemented using any type of physical medium such as, e.g., an optical medium, wireless medium, twisted pair, etc. Links may also be logical connections to give the connected nodes the property of adjacency in view of the operative networking protocols.

In one embodiment, the nodes of such a network interoperate in the manner specified by various protocols including, e.g., TCP/IP and protocols defined by, but not limited to, the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Berger, et al., "Generalized MPLS Signaling—RSVP-TE Extensions," RFC 3473, Internet Engineering Task Force, January 2003.

Vasseur, et al. "RSVP Path Computation Request and Reply Messages," Internet Draft, Internet Engineering Task Force, June 2004.

Lindem, et al., "Extensions to OSPF for Advertising Optional Router Capabilities," Internet Draft, Internet Engineering Task Force, October 2003.

Vasseur, et al., "OSPF Traffic Engineering Capability TLVs," Internet Draft, Internet Engineering Task Force, October 2002.

Vasseur, et al., "Inter-AS MPLS Traffic Engineering," Internet Draft, Internet Engineering Task Force, February 2003.

Vasseur, et al., "OSPF MPLS Traffic Engineering Capabilities," Internet Draft, Internet Engineering Task Force, February 2004.

Vasseur, et al., "IS-IS MPLS Traffic Engineering Capabilities," Internet Draft, Internet Engineering Task Force, February 2004.

The above documents are incorporated herein by reference in their entirety for all purposes.

In one embodiment, network nodes referenced herein are IP routers that implement multi protocol label switching (MPLS) and operate as label switched routers (LSRs). In one simple MPLS scenario, at the egress of the network, labels are assigned to each incoming packet based on its forwarding equivalence class before forwarding the packet to the next hop node. At each intermediate node, a forwarding selection and a new substitute label are determined by using the label found in the incoming packet as a reference to a label forwarding table. At the network egress (or one hop prior), a forwarding decision is made based on the incoming label but no label is included when the packet is sent on to the next hop.

The paths taken by packets that traverse the network in this manner are pre-configured and referred to as label switched paths (LSPs). Establishment of an LSP requires computation of a path, signaling along the path, and a modification of forwarding tables along the path. MPLS Traffic Engineering establishes special LSPs that satisfy certain constraints. For example, MPLS Traffic Engineering LSPs may provide a guaranteed bandwidth under certain conditions.

Embodiments of the present invention provide for distributed parallel computation of MPLS Traffic Engineering LSPs across multiple Autonomous Systems or areas. The term "Autonomous System" generally refers to a group of routers within a network that are subject to a common authority and use the same intradomain routing protocol. The term "area" generally refers to a collection of routers that share full network topology information with each other but not necessarily with routers outside the area even those with which they share a common administrative control. The term "area" as used herein also encompasses the term "level" which has a similar meaning for networks that employ IS-IS as their IGP (interior gateway protocol).

A "border router" is a router that connects two Autonomous Systems or two areas. All of the border routers are typically BGP (border gateway protocol) peers. The protocols used for routing within an Autonomous System or area (e.g., an IGP) do not operate on the links connecting the border routers. Within an Autonomous System or area, an IGP protocol such as the well-known IS-IS protocol or OSPF operates.

The remaining discussion refers to path placement across multiple Autonomous Systems but it will also be understood that wherever Autonomous Systems are being referred to, areas may be used also. The modified virtual shortest path tree algorithm presented herein is applicable to tree-based multi-Autonomous System topologies and can also be extended to arbitrary multi-Autonomous System topologies. A preferred constraint is that there be only one sequence of Autonomous Systems that connect any pair of Autonomous Systems.

Assuming a sequence of contiguous Autonomous Systems that begins with the Autonomous System of a head-end node and terminates with the Autonomous System of a tail-end node, it will be useful to define the terms "upstream," "downstream," "entry border router," and "exit border router." The term "upstream" refers to the direction of the head-end node. The term "downstream" refers to the direction of the tail-end node. An "entry border router" couples an Autonomous System to the next Autonomous System toward the head-end node. An "exit border router" couples an Autonomous System to the next Autonomous System toward the tail-end node.

A path computation element (PCE) is an entity having the capability to compute paths between any nodes in an Autonomous System and communicate with other path computation elements in other Autonomous Systems. A path computation client (PCC) is a requesting entity, e.g., a label-switch router (LSR) that sends a path computation request to a path computation element. When a path computation element sends a request to another path computation element, it acts as a path computation client.

FIG. 1 depicts a representative multiple Autonomous System network to which embodiments of the present invention may be applied. There are three Autonomous Systems: AS1, AS2, and AS3. FIG. 1 shows eight border routers positioned to connect between the Autonomous Systems: ASBR1, ASBR2 . . . ASBR8. Additionally, FIG. 1 shows AS1 as including routers 102, 106, 108, and 110, AS2 as including routers 112 and 114, and AS3 as including routers 104 and 116. In FIG. 1, ASBR1, ASBR8, and ASBR9 operate as path computation elements for their respective Autonomous Systems.

According to embodiments of the present invention, an MPLS Traffic Engineering LSP is placed across multiple Autonomous Systems by way of cooperation among path computation elements. Like in the virtual shortest path tree procedure described in U.S. patent application Ser. No. 10/767,574, placement of an MPLS Traffic Engineering LSP begins with a request from a head-end node of a prospective LSP to a local path computation element. Also, like in the previously disclosed virtual shortest path tree algorithm, the request is propagated from path computation element to path computation element until it reaches the Autonomous System of the requested tail-end node.

However, according to embodiments of the present invention, each path computation element that forwards the request does not wait for a response before commencing its own computations. Instead, the requesting path computation element computes the shortest path segments between the entry border routers and the exit border routers that satisfy all requested constraints. The path computation element that receives the original request from the head-end will compute the shortest constraint-satisfying path segments from the head-end node to the exit border routers of its Autonomous System. Similarly, the path computation element that receives the request and which resides in the same area or Autonomous System as the tail-end will compute the shortest path constraint-satisfying path segments from the tail-end node to the entry border routers of its Autonomous System or area.

Figure 2:
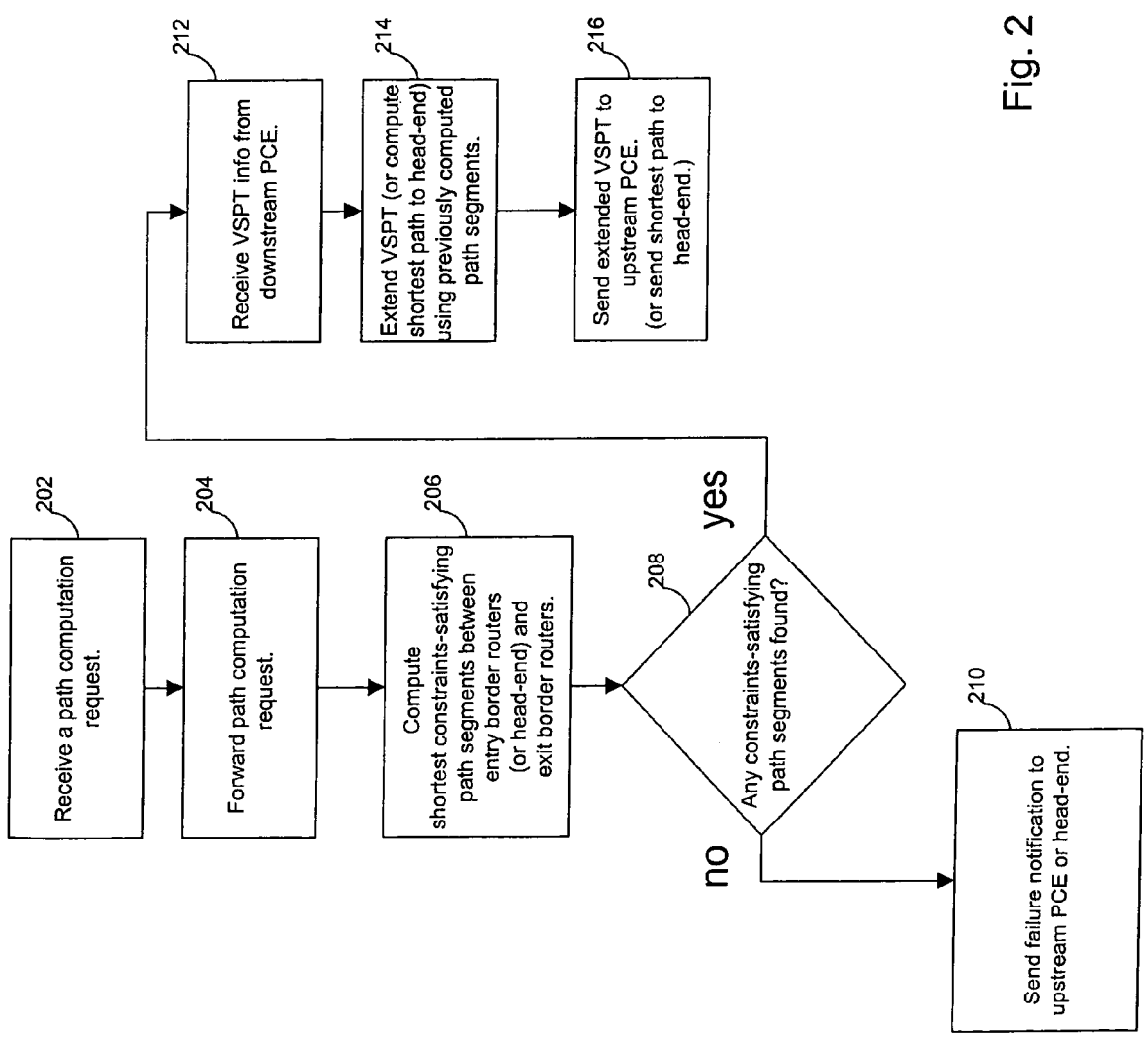
FIG. 2 is a flow chart describing steps of computing the path of an MPLS Traffic Engineering LSP across multiple Autonomous Systems according to one embodiment of the present invention.

FIG. 2 is a flow chart describing steps of operating a path computation element according to one embodiment of the present invention. FIG. 2 represents the operation of any path computation element that forwards a path computation request to another path computation element downstream. Thus the operative path computation element of FIG. 2 can be the path computation element that occupies the same Autonomous System as the head-end node or any path computation element in an intermediate Autonomous System between the head-end node's Autonomous System and the tail-end node Autonomous System. Generally speaking, the extension to the virtual shortest path tree algorithm described herein does not directly affect the operation of the path computation element that occupies the same Autonomous System as the tail-end node since that path computation element does not make any requests to a further downstream path computation element. Some of the steps of FIG. 2 operate somewhat differently for the path computation element that occupies the same Autonomous System as the head-end node and for path computation elements that occupy intermediate Autonomous Systems.

At step 202, the path computation element in question receives a path computation request from either the head-end node or an upstream path computation element. The request can be made in accordance with the protocol specified in Vasseur et al., "RSVP Path Computation Request in Reply Messages," Internet Draft, June 2002. At step 204, the path computation element forwards the path computation request to the next path computation element downstream.

At step 206, the path computation element computes the shortest constraints-satisfying path segments between all of the entry border routers and exit border routers of its own Autonomous System. For the path computation element in the Autonomous System occupied by the head-end, the shortest constraints-satisfying path segments are instead computed between the head-end and the exit border routers. In either case, these path segments are computed using the CSPF (constrained shortest path first) algorithm as known in the art or any other suitable algorithm. The computation is performed in advance of the receipt of any response to the forwarded path computation request of step 204. The constraints such as bandwidth used in the computation are found in the path computation request received during step 202.

It may be the case that no path segments are found between any pair of entry and exit border routers (or between the head-end and any exit border router) that satisfies the constraints. Step 208 determines whether any constraints-satisfying path segments were found in step 206. If no such path segments were found, then execution proceeds to step 210 which sends a failure notification to the upstream path computation element (or the head-end). This failure notification propagates upstream to the head-end. There is no need to wait for receipt of virtual shortest path tree information from the downstream path computation element because in fact there will be no way to extend a virtual shortest path tree in this case. If a response is received later from an upstream path computation element, this response is simply dropped.

The downstream path computation elements have been performing their own computations concurrently. At step 212, virtual shortest path tree information is received from the downstream path computation element. This information specifies a virtual shortest path tree that is routed at the tail-end node and extends to the exit border routers. The virtual shortest path tree information as received from a downstream path computation element may specify only nodes that serves as entry and exit border routers and may omit routers interior to Autonomous Systems.

At step 214, this virtual shortest path tree is extended to the entrance border routers using the path segment information developed at step 206. Again, an algorithm such as CSPF may be used to extend the virtual shortest path tree. For the path computation element in the same Autonomous System as the head-end, step 214 instead involves using the received virtual shortest path tree information and the path segments computed at step 206 to compute the final constraints-satisfying shortest path from the head-end to the tail-end.

At step 216, the extended virtual shortest path tree is sent to the next path computation element upstream. If this is the path computation element in the Autonomous System of the head-end node then the shortest path computed in step 214 is now sent to the head-end node.

Thus it will be seen that many of the calculations involved in path computation are performed concurrently by the various path computation elements. This greatly accelerates the path computation process thus reducing path placement time. Also if a particular path computation element determines that the requested path is not locally feasible a failure indication is propagated upstream without waiting to receive a response from the downstream path computation element.

Figure 3:
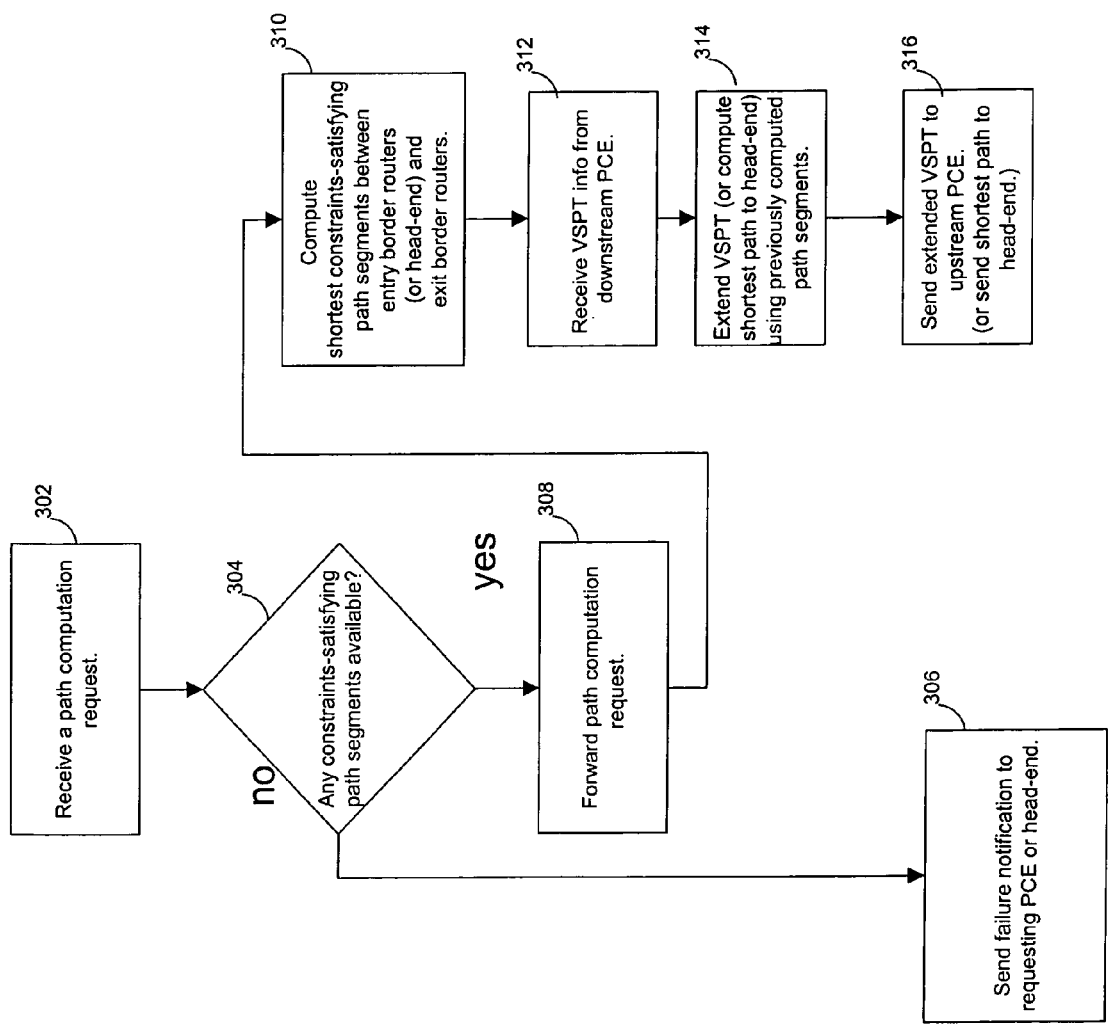
FIG. 3 is a flow chart describing steps of computing a path of an MPLS Traffic Engineering LSP across multiple Autonomous Systems according to an alternative embodiment of the present invention.

FIG. 3 is a flow chart describing steps of an alternative procedure that could be followed by a path computation element according to one embodiment of the present invention. At step 302, the path computation element receives a path computation request in the same manner as step 202 of FIG. 2. A step 304 then immediately tests whether any constraints-satisfying path segments are available within the local Autonomous System. These are internal path segments that interconnect any pair of entry border router and exit border router of the local Autonomous System or interconnect the head-end and any exit border router of the Autonomous System. This determination is made based on pre-computed information.

To prepare for the determination of step 304, each path computation element pre-computes (prior to any requests) the maximum available bandwidth in its domain for each pairing of entry border router (or head-end) and exit border router. These bandwidths are determined over a limited set of other possible constraints that might be specified in path computation requests. These other constraints are selected based on the observation of prior requests. When a new request is received, its bandwidth and constraints may be readily compared to the pre-computed database to determine whether in fact there is any constraints-satisfying path segment. If this check determines that there are no constraints-satisfying path segments available, then execution proceeds to step 306 where a failure notification is sent to the next path computation element upstream (or head-end). This procedure very quickly terminates path placements that are destined to be unsuccessful. If the requested path computation is in fact locally feasible, then processing proceeds to a step 308 where the path computation request is forwarded to the next path computation element downstream.

A step 310 computes the shortest constraints-satisfying path segments between the entry border routers (or head-end) and exit border routers in the same manner as step 206 of FIG. 2. Steps 312-316 proceed analogously to steps 212-216 of FIG. 2.

Figure 4:
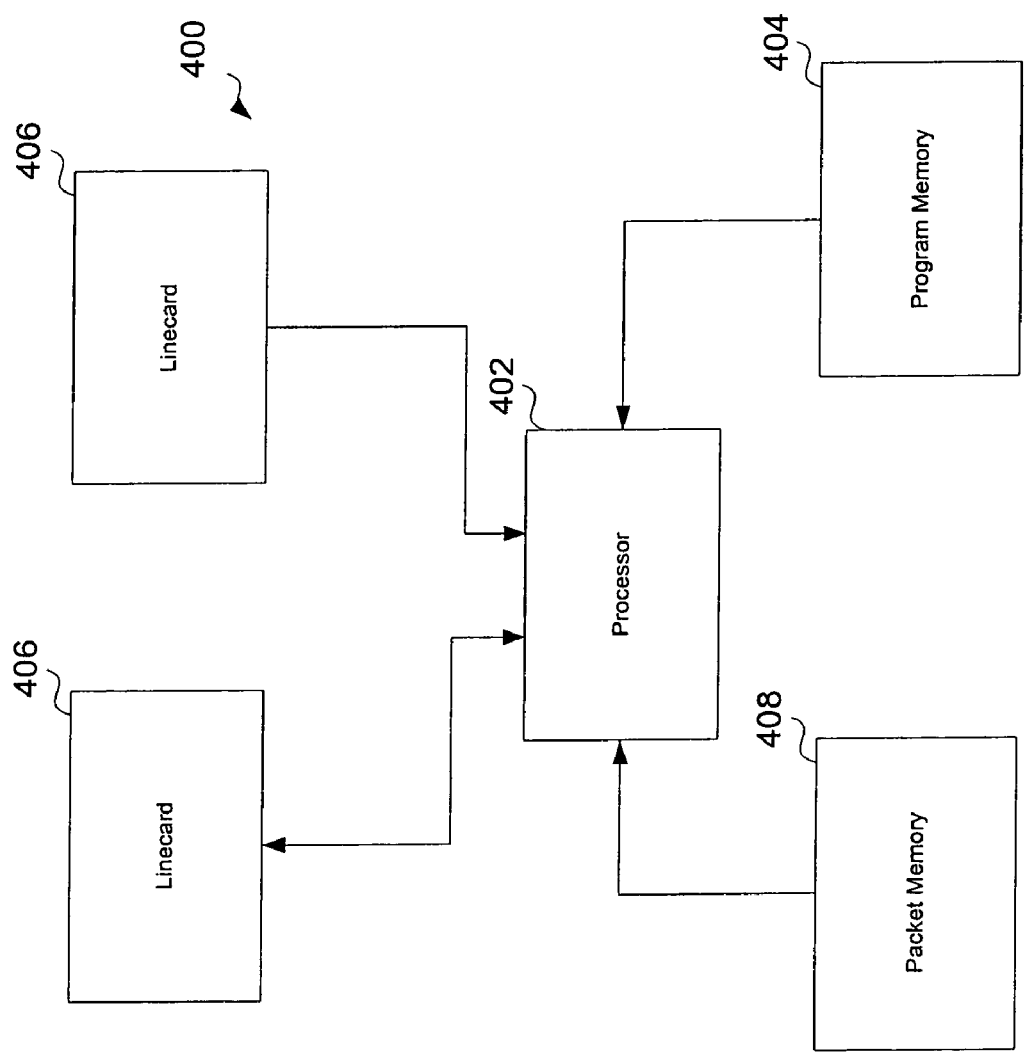
FIG. 4 depicts a network device suitable for implementing embodiments of the present invention.

FIG. 4 depicts a network device 400 that may be used to implement, e.g., any of the routers of FIG. 1 and/or perform any of the steps of FIG. 2 or FIG. 3. In one embodiment, network device 400 is a programmable machine that may be implemented in hardware, software, or any combination thereof. A processor 402 executes codes stored in a program memory 404. Program memory 404 is one example of a computer-readable medium. Program memory 404 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is another example of a computer-readable medium.

Network device 400 interfaces with physical media via a plurality of linecards 406. Linecards 406 may incorporate Ethernet interfaces, DSL interfaces, Gigabit Ethernet interfaces, 10-Gigabit Ethernet interfaces, SONET interfaces, etc. As packets are received, processed, and forwarded by network device 400, they may be stored in a packet memory 408. Network device 400 implements all of the network protocols and extensions thereof described above as well as the data networking features provided by the present invention.

In one implementation, control plane operations such as the path computation operations described above are controlled and signaled by processor 402 while forwarding tables are maintained on linecards 406. The present invention is, however, not limited to a distributed architecture. To implement functionality according to the present invention, linecards 406 may incorporate processing and memory resources similar to those discussed above in connection with the network device as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the present invention can be applied to Traffic Engineering LSPs that do not traverse multiple Autonomous Systems or areas. Also, wherever paths or path segments are referred to as "shortest" it will be understood that this encompasses optimizations in any suitable metric.

The invention claimed is:

1. A method for operating a first path computation element in a first autonomous system to participate in establishing a Multi-Protocol Label Switching (MPLS) Traffic Engineering Label Switched Path (LSP) from a head-end node to a tail-end node, said first autonomous system being positioned between a second autonomous system and a third autonomous system, each of said first, second, and third autonomous systems comprising a group of routers subject to a common authority, said method comprising:

receiving at said first path computation element, a path computation request forwarded from a second path computation element in said second autonomous system;

forwarding from said first path computation element, said path computation request to a third path computation element in said third autonomous system; and upon receiving said path computation request and prior to receiving a response from said third path computation element, computing constraints-satisfying shortest path segments between border routers coupling said first autonomous system to said second autonomous system and border routers coupling said first autonomous system and said third autonomous system using constraints received in said path computation request.

2. The method of claim 1 further comprising:

if no constraints-satisfying path segments are found, sending an indication of failure to said second path computation element, wherein said indication of failure is propagated upstream to the head-end node.

3. The method of claim 1 further comprising:

receiving a response from said third path computation element, said response comprising virtual shortest path tree information identifying a virtual shortest path tree rooted at said tail-end node and reaching to one of said border routers coupling said first autonomous system and said third autonomous system;

extending said virtual shortest path tree to reach to one or more border routers coupling said first autonomous system and said second autonomous system by using said computed constraints-satisfying shortest path segments; and forwarding information identifying said extended virtual shortest path tree to said second path computation element.

4. A method for operating a first path computation element in a first autonomous system to participate in establishing a Multi-Protocol Label Switching (MPLS) Traffic Engineering Label Switched Path (LSP) from a head-end node in said first autonomous system to a tail-end node, said method comprising:

receiving at said first path computation element, a path computation request forwarded from said head-end node;

forwarding from said first path computation element, said path computation request to a second path computation element in a second autonomous system; and upon receiving said path computation request and prior to receiving a response from said second path computation element, computing constraints-satisfying shortest path segments between said head-end node and border routers coupling said first autonomous system and said second autonomous system using constraints received in said path computation request;

wherein each of said first and second autonomous systems comprises a group of routers subject to a common authority.

5. The method of claim 4 further comprising:

if no constraints-satisfying path segments are found, sending an indication of failure to said head-end node.

6. The method of claim 4 further comprising:
receiving a response from said second path computation element, said response comprising virtual shortest path tree information identifying a virtual shortest path tree rooted at said tail-end node and reaching to one of said border routers coupling said first autonomous system and said second autonomous system;
using said virtual shortest path tree information and said computed constraints-satisfying path segments to compute a constraints-satisfying shortest path between said head-end node and said tail-end node; and
forwarding information identifying said shortest path to said head-end node.

7. A method for operating a first path computation element in a first autonomous system to participate in establishing a Multi-Protocol Label Switching (MPLS) Traffic Engineering Label Switched Path (LSP) from a head-end node to a tail-end node, said first autonomous system being positioned between a second autonomous system and a third autonomous system, each of said first, second, and third autonomous systems comprising a group of routers subject to a common authority, said method comprising:
receiving at said first path computation element, a path computation request forwarded from a second path computation element in said second autonomous system, said path computation request including at least one constraint for said MPLS Traffic Engineering LSP;
verifying if at least one path segment satisfying said at least one constraint exists between any border router coupling said first autonomous system and said second autonomous system and any border router coupling said first autonomous system and said third autonomous system;
only if availability of said at least one path segment is verified, forwarding from said first path computation element, said path computation request to a third path computation element in said third autonomous system; and
prior to receiving a response from said third path computation element, computing constraints-satisfying shortest path segments between border routers coupling said first autonomous system to said second autonomous system and border routers coupling said first autonomous system and said third autonomous system.

8. The method of claim 7 wherein verifying comprises:
consulting a pre-computed database comprising available bandwidth for each pairing of said border routers coupling said first autonomous system and said second autonomous system and said border routers coupling said first autonomous system and said third autonomous system.

9. The method of claim 7 further comprising:
receiving a response from said third path computation element, said response comprising virtual shortest path tree information identifying a virtual shortest path tree rooted at said tail-end node and reaching to one of said border routers coupling said first autonomous system and said third autonomous system;
extending said virtual shortest path tree to reach to one or more border routers coupling said first autonomous system and said second autonomous system by using said computed shortest path segments; and
forwarding information identifying said extended virtual shortest path tree to said second path computation element.

10. The method of claim 7 further comprising:
if availability of said at least one path segment cannot be verified, sending an indication of failure to said second path computation element.

11. A method for operating a first path computation element in a first autonomous system to participate in establishing a Multi-Protocol Label Switching (MPLS) Traffic Engineering Label Switched Path (LSP) from a head-end node in said first autonomous system to a tail-end node, said method comprising:
receiving at said first path computation element, a path computation request from said head-end node, said path computation request including one or more constraints for said MPLS Traffic Engineering LSP;
verifying if at least one path segment satisfying said one or more constraints exist between said head-end node and any border router coupling said first autonomous system and a second autonomous system through which said tail-end node is reached;
only if availability of said at least one path segment is verified, forwarding from said first path computation element, said path computation request to a second path computation element in said second autonomous system; and
prior to receiving a response from said second path computation element, computing constraints-satisfying shortest path segments between said head-end node and border routers coupling said first autonomous system and said second autonomous system:
wherein each of said first and second autonomous systems comprises a group of routers subject to a common authority.

12. The method of claim 11 wherein verifying comprises:
consulting a pre-computed database.

13. The method of claim 11 further comprising:
receiving a response from said second path computation element, said response comprising virtual shortest path tree information identifying a virtual shortest path tree rooted at said tail-end node and reaching to one of said border routers coupling said first autonomous system and said second autonomous system;
using said virtual shortest path tree information and said computed path segments to compute a constraints-satisfying shortest path between said head-end node and said tail-end node; and
forwarding information identifying said shortest path to said head-end node.

14. The method of claim 11 further comprising:
if availability of said at least one path segment cannot be verified, sending an indication of failure to said head-end node.

15. A computer-readable non-transitory storage medium encoded with a computer program for operating a first path computation element in a first autonomous system to participate in establishing a Multi-Protocol Label Switching (MPLS) Traffic Engineering Label Switched Path (LSP) from a head-end node to a tail-end node, said first autonomous system being positioned between a second autonomous system and a third autonomous system, each of said first, second, and third autonomous systems comprising a group of routers subject to a common authority, said computer program comprising:
code that causes receipt of a path computation request forwarded from a second path computation element in said second autonomous system;

code that causes forwarding of said path computation request to a third path computation element in said third autonomous system; and code that causes, upon receiving said path computation request and prior to receipt of a response from said third path computation element, computation of constraints-satisfying shortest path segments between border routers coupling said first autonomous system to said second autonomous system and border routers coupling said first autonomous system and said third autonomous system using constraints received in said path computation request.

16. The computer-readable storage medium of claim 15 further comprising:

code that causes, if no constraints-satisfying path segments are found, sending of an indication of failure to said second path computation element.

17. The computer-readable storage medium of claim 15 further comprising:

code that causes receipt of a response from said third path computation element, said response comprising virtual shortest path tree information identifying a virtual shortest path tree rooted at said tail-end node and reaching to one of said border routers coupling said first autonomous system and said third autonomous system;

code that causes extension of said virtual shortest path tree to reach to one or more border routers coupling said first autonomous system and said second autonomous system by using said computed constraints-satisfying shortest path segments; and code that causes forwarding of information identifying said extended virtual shortest path tree to said second path computation element.

18. A computer-readable non-transitory storage medium encoded with a computer program for operating a first path computation element in a first autonomous system to participate in establishing a Multi-Protocol Label Switching (MPLS) Traffic Engineering Label Switched Path (LSP) from a head-end node in said first autonomous system to a tail-end node, said computer program comprising:

code that causes receipt of a path computation request forwarded from said head-end node;

code that causes forwarding of said path computation request to a second path computation element in a second autonomous system; and code that causes, upon receiving said path computation request and prior to receiving a response from said second path computation element, computation of constraints-satisfying shortest path segments between said head-end node and border routers coupling said first autonomous system and said second autonomous system using constraints received in said path computation request;

wherein each of said first and second autonomous systems comprises a group of routers subject to a common authority.

19. The computer-readable storage medium of claim 18 further comprising:

code that, if no constraints-satisfying path segments are found, causes sending of an indication of failure to said head-end node.

20. The computer-readable storage medium of claim 18 further comprising:

code that causes receipt of a response from said second path computation element, said response comprising virtual shortest path tree information identifying a virtual shortest path tree rooted at said tail-end node and reaching to one of said border routers coupling said first autonomous system and said second autonomous system;

code that causes use of said virtual shortest path tree information and said computed constraints-satisfying path segments to compute a constraints-satisfying shortest path between said head-end node and said tail-end node; and code that causes forwarding of information identifying said shortest path to said head-end node.

21. A computer-readable non-transitory storage medium encoded with a computer program for operating a first path computation element in a first autonomous system to participate in establishing a Multi-Protocol Label Switching (MPLS) Traffic Engineering Label Switched Path (LSP) from a head-end node to a tail-end node, said first autonomous system being positioned between a second autonomous system and a third autonomous system, each of said first, second, and third autonomous systems comprising a group of routers subject to a common authority, said computer program comprising:

code that causes receipt of a path computation request forwarded from a second path computation element in said second autonomous system, said path computation request including at least one constraint for said MPLS Traffic Engineering LSP;

code that causes verification of whether at least one path segment satisfying said at least one constraint exists between any border router coupling said first autonomous system and said second autonomous system and any border router coupling said first autonomous system and said third autonomous system;

code that causes, only if availability of said at least one path segment is verified, forwarding of said path computation request to a third path computation element in said third autonomous system; and code that causes, prior to receipt of a response from said third path computation element, computation of constraints-satisfying shortest path segments between border routers coupling said first autonomous system to said second autonomous system and border routers coupling said first autonomous system and said third autonomous system.

22. The computer-readable storage medium of claim 21 wherein said code that causes verification comprises:

code that causes consultation of a pre-computed database.

23. The computer-readable storage medium of claim 21 further comprising:

code that causes receipt of a response from said third path computation element, said response comprising virtual shortest path tree information identifying a virtual shortest path tree rooted at said tail-end node and reaching to one of said border routers coupling said first autonomous system and said third autonomous system;

code that causes extension of said virtual shortest path tree to reach to one or more border routers coupling said first autonomous system and said second autonomous system by using said computed shortest path segments; and code that causes forwarding of information identifying said extended virtual shortest path tree to said second path computation element.

24. The computer-readable storage medium of claim 21 further comprising:

code that causes, if availability of said at least one path segment cannot be verified, sending of an indication of failure to said second path computation element.

25. A computer-readable non-transitory storage medium encoded with a computer program for operating a first path computation element in a first autonomous system to participate in establishing a Multi-Protocol Label Switching (MPLS) Traffic Engineering Label Switched Path (LSP) from a head-end node in said first autonomous system to a tail-end node, said computer program comprising:

code that causes receipt of a path computation request from said head-end node, said path computation request including one or more constraints for said MPLS Traffic Engineering LSP;

code that causes verification of whether at least one path segment satisfying said one or more constraints exist between said head-end node and any border router coupling said first autonomous system and a second autonomous system through which said tail-end node is reached;

code that causes, only if availability of said at least one path segment is verified, forwarding of said path computation request to a second path computation element in said second autonomous system; and code that causes, prior to receipt of a response from said second path computation element, computation of constraints-satisfying shortest path segments between said head-end node and border routers coupling said first autonomous system and said second autonomous system;

wherein each of said first and second autonomous systems comprises a group of routers subject to a common authority.

26. The computer-readable storage medium of claim 25 wherein said code that causes verification comprises:

code that causes consultation of a pre-computed database.

27. The computer-readable storage medium of claim 25 further comprising:

code that causes receipt of a response from said second path computation element, said response comprising virtual shortest path tree information identifying a virtual shortest path tree rooted at said tail-end node and reaching to one of said border routers coupling said first autonomous system and said second autonomous system;

code that causes use of said virtual shortest path tree information and said computed path segments to compute a constraints-satisfying shortest path between said head-end node and said tail-end node; and code that causes forwarding of information identifying said shortest path to said head-end node.

28. The computer-readable storage medium of claim 25 further comprising:

code that causes, if availability of said at least one path segment cannot be verified, sending of an indication of failure to said head-end node.

29. Apparatus for operating a first path computation element in a first autonomous system to participate in establishing a Multi-Protocol Label Switching (MPLS) Traffic Engineering Label Switched Path (LSP) from a head-end node to a tail-end node, said first autonomous system being positioned between a second autonomous system and a third autonomous system, each of said first, second, and third autonomous systems comprising a group of routers subject to a common authority, said apparatus comprising:

a processor;

a memory that holds software to be executed by said processor, said software comprising:

code that causes receipt of a path computation request forwarded from a second path computation element in said second autonomous system;

code that causes forwarding of said path computation request to a third path computation element in said third autonomous system; and code that causes, upon receiving said path computation request and prior to receipt of a response from said third path computation element, computation of constraints-satisfying shortest path segments between border routers coupling said first autonomous system to said second autonomous system and border routers coupling said first autonomous system and said third autonomous system using constraints received in said path computation request.

30. Apparatus for operating a first path computation element in a first autonomous system to participate in establishing a Multi-Protocol Label Switching (MPLS) Traffic Engineering Label Switched Path (LSP) from a head-end node in said first autonomous system to a tail-end node, said apparatus comprising:

a processor;

a memory that holds software to be executed by said processor, said software comprising:

code that causes receipt of a path computation request forwarded from said head-end node;

code that causes forwarding of said path computation request to a second path computation element in a second autonomous system; and code that causes, upon receiving said path computation request and prior to receiving a response from said second path computation element, computation of constraints-satisfying shortest path segments between said head-end node and border routers coupling said first autonomous system and said second autonomous system using constraints received in said path computation request;

wherein each of said first and second autonomous systems comprises a group of routers subject to a common authority.

31. Apparatus for operating a first path computation element in a first autonomous system to participate in establishing a Multi-Protocol Label Switching (MPLS) Traffic Engineering Label Switched Path (LSP) from a head-end node to a tail-end node, said first autonomous system being positioned between a second autonomous system and a third autonomous system, each of said first, second, and third autonomous systems comprising a group of routers subject to a common authority, said apparatus comprising:

a processor;

a memory that holds software to be executed by said processor, said software comprising:

code that causes receipt of a path computation request forwarded from a second path computation element in said second autonomous system, said path computation request including at least one constraint for said MPLS Traffic Engineering LSP;

code that causes verification of whether at least one path segment satisfying said at least one constraint exists between any border router coupling said first autonomous system and said second autonomous system and any border router coupling said first autonomous system and said third autonomous system; and code that causes, only if availability of said at least one path segment is verified, forwarding of said path computation request to a third path computation element in said third autonomous system; and code that causes, prior to receipt of a response from said second path computation element, computation of constraints-satisfying shortest path segments between said head-end node and border routers coupling said first autonomous system and said second autonomous system.

32. Apparatus for operating a first path computation element in a first autonomous system to participate in establishing a Multi-Protocol Label Switching (MPLS) Traffic Engineering Label Switched Path (LSP) from a head-end node in said first autonomous system to a tail-end node, said apparatus comprising:

a processor;

a memory that holds software to be executed by said processor, said software comprising:

code that causes receipt of a path computation request from said head-end node, said path computation request including one or more constraints for said MPLS Traffic Engineering LSP;

code that causes verification of whether at least one path segment satisfying said one or more constraints exist between said head-end node and any border router coupling said first autonomous system and said second autonomous system through which said tail-end node is reached;

code that causes, only if availability of said at least one path segment is verified, forwarding of said path computation request to a second path computation element in said second autonomous system;

code that causes, prior to receiving a response from said second path computation element, computing constraints-satisfying shortest path segments between said head-autonomous end node and border routers coupling said first autonomous system and said second autonomous system; and wherein each of said first and second autonomous systems comprises a group of routers subject to a common authority.

33. Apparatus for operating a first path computation element in a first autonomous system to participate in establishing a Multi-Protocol Label Switching (MPLS) Traffic Engineering Label Switched Path (LSP) from a head-end node to a tail-end node, said first autonomous system being positioned between a second autonomous system and a third autonomous system, each of said first, second, and third autonomous systems comprising a group of routers subject to a common authority, said apparatus comprising:

means for receiving a path computation request forwarded from a second path computation element in said second autonomous system;

means for forwarding said path computation request to a third path computation element in said third autonomous system; and means for, upon receiving said path computation request and prior to receiving a response from said third path computation element, computing constraints-satisfying shortest path segments between border routers coupling said first autonomous system to said second autonomous system and border routers coupling said first autonomous system and said third autonomous system using constraints received in said path computation request.

34. A method for operating a first path computation element in a first area to participate in establishing a Multi-Protocol Label Switching (MPLS) Traffic Engineering Label Switched Path (LSP) from a head-end node to a tail-end node, said first area being positioned between a second area and a third area, each area comprising its own collection of routers, said method comprising:

receiving at said first path computation element, a path computation request forwarded from a second path computation element in said second area;

forwarding from said first path computation element, said path computation request to a third path computation element in said third area; and upon receiving said path computation request and prior to receiving a response from said third path computation element, computing constraints-satisfying shortest path segments between border routers coupling said first area to said second area and border routers coupling said first area and said third area using constraints received in said path computation request;

wherein each of said areas comprises a collection of routers that share network topology information.

35. A method for operating a first path computation element in a first area to participate in establishing a Multi-Protocol Label Switching (MPLS) Traffic Engineering Label Switched Path (LSP) from a head-end node in said first area to a tail-end node, said method comprising:

receiving at said first path computation element, a path computation request forwarded from said head-end node;

forwarding from said first path computation element, said path computation request to a second path computation element in a second area; and upon receiving said path computation request and prior to receiving a response from said second path computation element, computing constraints-satisfying shortest path segments between said head-end node and border routers coupling said first area and said second area using constraints received in said path computation request;

wherein each of said areas comprises its own collection of routers that share network topology information.

36. A method for operating a first path computation element in a first area to participate in establishing a Multi-Protocol Label Switching (MPLS) Traffic Engineering Label Switched Path (LSP) from a head-end node to a tail-end node, said first area being positioned between a second area and a third area, each area comprising its own collection of routers, said method comprising:

receiving at said first path computation element, a path computation request forwarded from a second path computation element in said second area, said path computation request including at least one constraint for said MPLS Traffic Engineering LSP;

verifying if at least one path segment satisfying said at least one constraint exists between any border router coupling said first area and said second area and any border router coupling said first area and said third area;

only if availability of said at least one path segment is verified, forwarding from said first path computation element, said path computation request to a third path computation element in said third area; and upon receiving said path computation request and prior to receipt of a response from said third path computation element, computing of constraints-satisfying shortest path segments between border routers coupling said first area to said second area and border routers coupling first area and said third area using constraints received in said path computation request;

wherein each of said areas comprises a collection of routers that share network topology information.

37. A method for operating a first path computation element in a first area to participate in establishing a Multi-Protocol Label Switching (MPLS) Traffic Engineering Label Switched Path (LSP) from a head-end node in said first area to a tail-end node, said method comprising:
- receiving a path computation request from said head-end node, said path computation request including one or more constraints for said MPLS Traffic Engineering LSP;
- verifying if at least one path segment satisfying said one or more constraints exist between said head-end node and any border router coupling said first area and a second area through which said tail-end node is reached;
- only if availability of said at least one path segment is verified, forwarding said path computation request to a second path computation element in said second area; and
- upon receiving said path computation request and prior to receiving a response from said second path computation element, computing constraints-satisfying shortest path segments between said head-end node and border routers coupling said first area and said second area using constraints received in said path computation request; and
- wherein each of said areas comprises its own collection of routers that share network topology information.

38. A computer-readable non transitory storage medium encoded with a computer program for operating a first path computation element in a first area to participate in establishing a Multi-Protocol Label Switching (MPLS) Traffic Engineering Label Switched Path (LSP) from a head-end node to a tail-end node, said first area being positioned between a second area and a third area, each area comprising its own collection of routers, said computer program comprising:
- code that causes receipt of a path computation request forwarded from a second path computation element in said second area;
- code that causes forwarding of said path computation request to a third path computation element in said third area;
- code that causes, upon receiving said path computation request and prior to receipt of a response from said third path computation element, computing of constraints-satisfying shortest path segments between border routers coupling said first area to said second area and border routers coupling said first area and said third area using constraints received in said path computation request; and
- wherein each of said areas comprises a collection of routers that share network topology information.

39. A computer-readable non-transitory storage medium encoded with a computer program for operating a first path computation element in a first area to participate in establishing a Multi-Protocol Label Switching (MPLS) Traffic Engineering Label Switched Path (LSP) from a head-end node in said first area to a tail-end node, said computer program comprising:
- code that causes receipt of a path computation request forwarded from said head-end node;
- code that causes forwarding of said path computation request to a second path computation element in a second area; and
- code that causes, upon receiving said path computation request and prior to receiving a response from said second path computation element, computation of constraints-satisfying shortest path segments between said head-end node and border routers coupling said first area and said second area using constraints received in said path computation request;
- wherein each of said areas comprises its own collection of routers that share network topology information.

40. A computer-readable non-transitory storage medium encoded with a computer program for operating a first path computation element in a first area to participate in establishing a Multi-Protocol Label Switching (MPLS) Traffic Engineering Label Switched Path (LSP) from a head-end node to a tail-end node, said first area being positioned between a second area and a third area, each area comprising its own collection of routers, said computer program comprising:
- code that causes receipt of a path computation request forwarded from a second path computation element in said second area, said path computation request including at least one constraint for said MPLS Traffic Engineering LSP;
- code that causes verification of whether at least one path segment satisfying said at least one constraint exists between any border router coupling said first area and said second area and any border router coupling said first area and said third area; and
- code that causes, only if availability of said at least one path segment is verified, forwarding of said path computation request to a third path computation element in said third area; and
- code that causes, upon receiving said path computation request and prior to receipt of a response from said third path computation element, computing of constraints-satisfying shortest path segments between border routers coupling said first area to said second area and border routers coupling said first area and said third area using constraints received in said path computation request;
- wherein each of said areas comprises a collection of routers that share network topology information.

41. A computer-readable non-transitory storage medium encoded with a computer program for operating a first path computation element in a first area to participate in establishing a Multi-Protocol Label Switching (MPLS) Traffic Engineering Label Switched Path (LSP) from a head-end node in said first area to a tail-end node, said computer program comprising:
- code that causes receipt of a path computation request from said head-end node, said path computation request including one or more constraints for said MPLS Traffic Engineering LSP;
- code that causes verification of whether at least one path segment satisfying said one or more constraints exist between said head-end node and any border router coupling said first area and a second area through which said tail-end node is reached; and
- code that causes, only if availability of said at least one path segment is verified, forwarding of said path computation request to a second path computation element in said second area;
- code that causes, upon receiving said path computation request and prior to receiving a response from said second path computation element, computing constraints-satisfying shortest path segments between said head-end node and border routers coupling said first area and said second area using constraints received in said path computation request; and
- wherein each of said areas comprises its own collection of routers that share network topology information.

* * * * *